April 5, 1960 — E. MARTIN — 2,931,232
VARIABLE VERTICAL SPEED MIXER

Filed May 13, 1957 — 3 Sheets-Sheet 1

INVENTOR.
EUGENE MARTIN
BY Otto Moeller
ATTORNEY

April 5, 1960 E. MARTIN 2,931,232
VARIABLE VERTICAL SPEED MIXER
Filed May 13, 1957 3 Sheets-Sheet 2

INVENTOR.
EUGENE MARTIN
BY Otto Moeller
ATTORNEY

April 5, 1960  E. MARTIN  2,931,232
VARIABLE VERTICAL SPEED MIXER
Filed May 13, 1957  3 Sheets-Sheet 3

INVENTOR.
EUGENE MARTIN
BY
Otto Moeller
ATTORNEY

United States Patent Office 2,931,232
Patented Apr. 5, 1960

2,931,232

VARIABLE VERTICAL SPEED MIXER

Eugene Martin, York, Pa., assignor to Capitol Products Corporation, Mechanicsburg, Pa., a corporation of Pennsylvania Application May 13, 1957, Serial No. 658,659

2 Claims. (Cl. 74—16)

This invention relates to vertical mixers for beating or mixing dough or other materials, wherein a vertical beater spindle is moved in an orbital path while rotating on its own axis.

It is an object of the invention to provide a mixer of this type having a variable speed transmission and a direct drive from an electric motor, which is simple and compact in construction, light in weight, that is readily and conveniently assembled, and wherein the operating mechanism therefor is readily accessible for maintenance and repair.

Another object is to provide a novel, compact, simple and efficient power trasmission and change speed mechanism for a mixer of the above type.

Another object is to provide a mixer of the above type having a direct driven variable speed transmission arranged to occupy a minimum of space and providing for a lateral power take-off for operating auxiliary appliances such as a fruit juicer, meat grinder or other attachments.

These and other objects, which will become apparent from the following description, are attained by the means described herein and disclosed in the accompanying drawings, in which.

Figure 1:
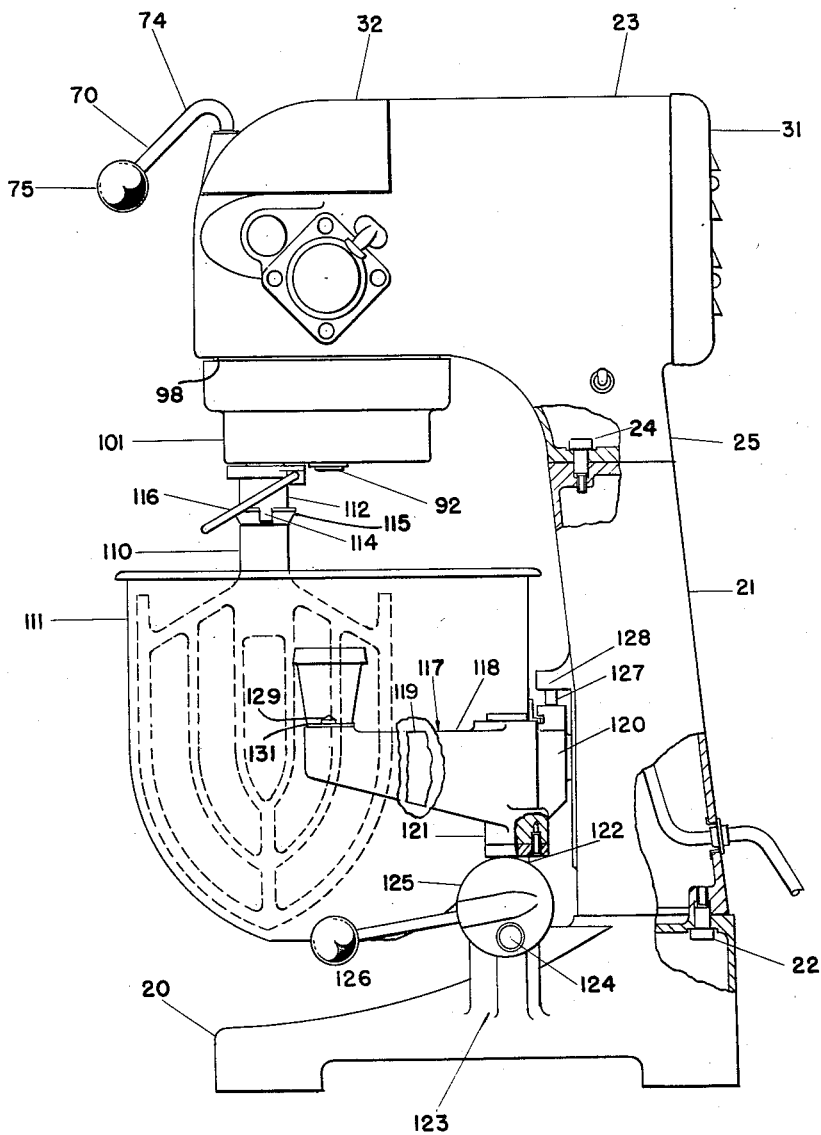
Figure 1 is a view in side elevation of a mixing machine embodying the invention, parts being broken away and shown in section.
Figure 2:
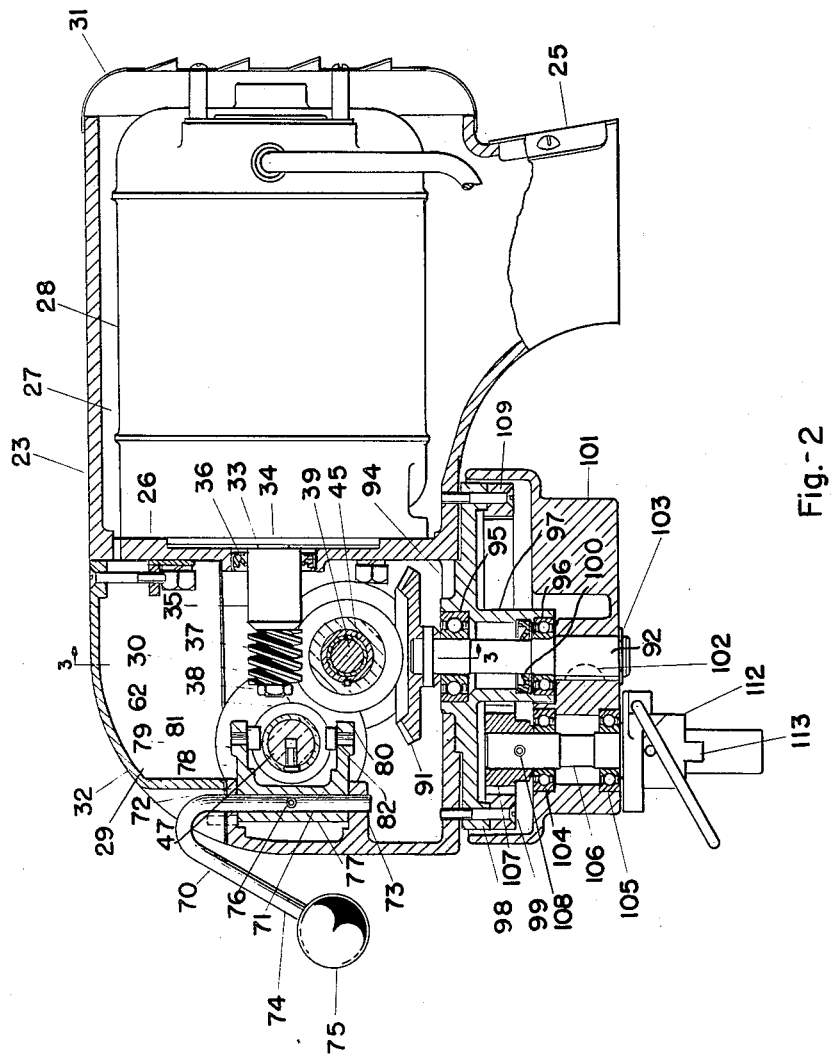
Figure 2 is an enlarged vertical central longitudinal sectional view through the upper portion of the mixing machine, parts being show in elevation.

Referring particularly to Figure 1, the mixer comprises a hollow open bottom base 20, which may be made in the from of a casting. A hollow column 21, preferably substantially rectangular in cross section, which may also be made in the form of a casting, is mounted on one end portion of the base 20 and is secured thereto in any suitable manner, as by a plurality of socket head shouldered screws accessible through the open bottom of base 20, one of said screws being shown at 22. Mounted on top of the column 21 and extending therebeyond to overhang the base 20 is a housing 23, which may also be made in the form of a casting. The housing 23 is secured to the column 21 in any suitable manner, as by a plurality of socket head shouldered screws 24 accessible through an opening in the lower rearward end of housing 23, the opening being normally closed by a removable cover 25.

The housing 23 is provided with a transversely extending partition 26 to form a rear compartment 27 in which a motor 28 is securely mounted in horizontal position in any suitable manner, and a front compartment 29 in which is housed the mixer transmission 30. At its rearward end, the housing 23 is formed with an opening for insertion of the motor 28 into compartment 27 or removal therefrom, the opening being normally closed by a removable cover 31. The upper forward end of the housing 23 is formed with an opening providing for insertion and assembly of the transmission 30 in the front compartment 29, the opening being normally closed by a removable cover 32.

Motor shaft 33 extends forwardly from motor 28 through an opening 34 in partition 26 into the front compartment 29. A spacer sleeve 35 is mounted on the rearward end of motor shaft 33 and an oil seal 36 provides a closure for the annular space between the sleeve 35 and the opening 34 in the partition 26. Keyed or otherwise suitably secured on the forward end of motor shaft 33 for rotation therewith is a worm 37. Axial movement of the worm 37 with respect to motor shaft 33 is prevented by a nut 38 threaded on the free end of shaft 33, which nut 38 maintains the worm 37 in abutting relation with respect to the sleeve 35.

A horizontal driving or main shaft 39 is disposed transversely within the front compartment 29 beneath the worm 37, and is journaled at one end in a bearing 40 supported in one side wall of the housing 23, and journaled at its other end in a bearing 41 supported in a removable auxiliary attachment housing 42 carried by the opposite side wall of the housing 23.

Figure 3:
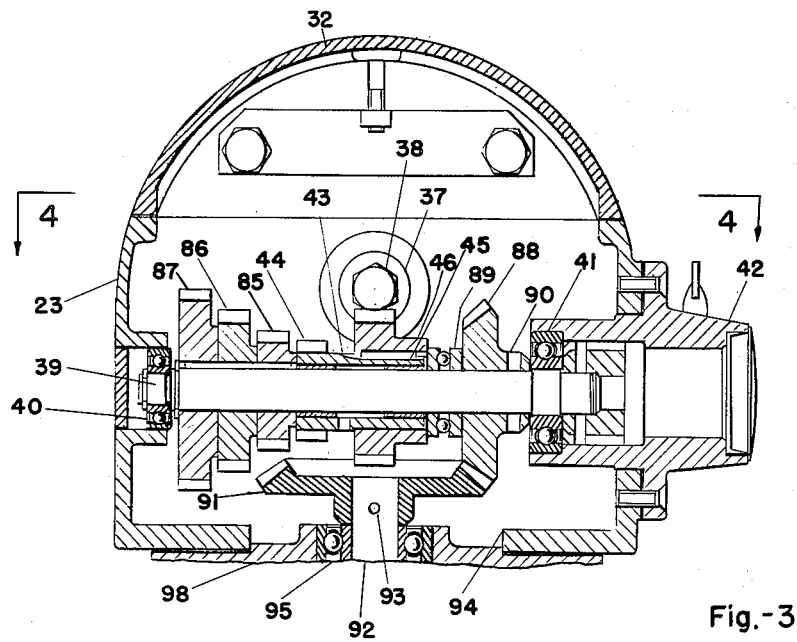
Figure 3 is a sectional view taken on the line 3—3 of Figure 2.

Mounted on driving shaft 39 for rotation with respect thereto, as best shown in Figure 3, is a worm and drive gear assembly 43, which includes a drive gear 44 having a hub extension 45 of reduced diameter on which is keyed a worm gear 46. Worm gear 46 meshes with worm 37 whereby rotational movement is imparted to the drive gear assembly 43 and its drive gear 44.

Figure 4:
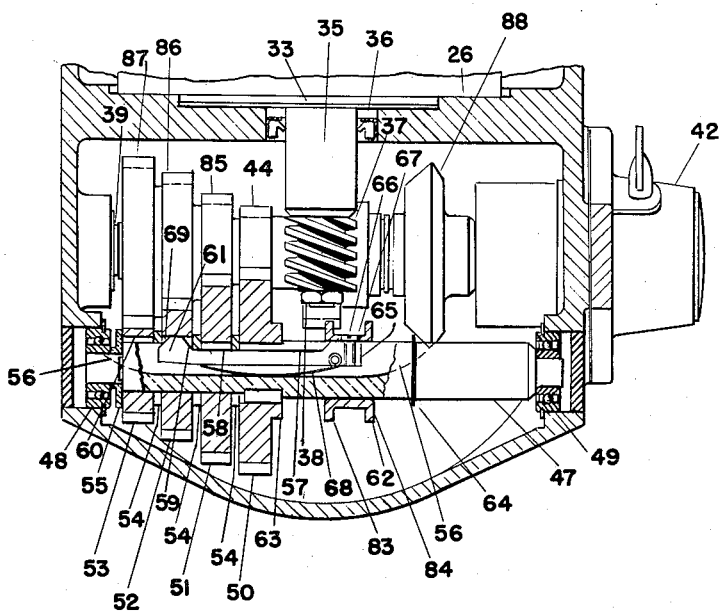
Figure 4 is a sectional view taken on the line 4—4 of Figure 3.

A shifting or counter shaft 47, shown best in Fig. 4, in axial parallelism with respect to driving shaft 39 is disposed in front compartment 29 above and forward of driving shaft 39, and is journaled at its ends in bearings 48 and 49 supported, respectively, in opposite side walls of the housing 23.

Keyed on shifting shaft 47 is the drive gear 50 which meshes with drive gear 44 for continuous rotation of the shifting shaft 47. Change speed gears 51, 52 and 53 of different diameters are rotatably mounted on shifting shaft 47 between the bearing 48 and the drive gear 50. Spacing washers 54 are disposed between gears 50, 51; 51, 52; 52, 53; and a thrust washer 55 is disposed between gear 53 and bearing 48. The large diameter gear 51, the intermediate diameter gear 52 and the small diameter gear 53 constitute, respectively, the high speed gear, the intermediate speed gear and the low speed gear.

Means, now to be described, is provided for selectively connecting any one of the gears 51, 52 and 53 in driven relation with the shaft 47. For this purpose, the shaft 47 is provided with an external elongated axially extending slot 56, in which slot is disposed a driving key 57 adapted for movement lengthwise in the slot. The gears 51, 52 and 53 are provided, respectively, with internal axially extending slots 58, 59 and 60 adapted to selectively receive the lug 61 on one end of the driving key 57, depending on the longitudinally adjusted position of the driving key 57 in the slot 56.

A clutch sleeve 62 is mounted on the shaft 47 for slidable movement axially therealong and is disposed thereon at that side of drive gear 50 opposite the change speed gears 51, 52 and 53. Axial movement of the clutch sleeve 62 along the shaft 47 is limited in one direction by abutment against the hub 63 of the drive gear 50, and in the opposite direction by abutment against a snap ring 64 on the shaft 47.

The clutch sleeve 62 is mounted on the shaft 47 for rotation therewith through the medium of connecting means with the end 65 of driving key 57 opposite its gear engaging lug 61. This connecting means includes a fillister head screw 66 threaded into the end 65 of the driving key 57, the head of screw 66 being received in an opening 67 in the clutch sleeve 62. The opening 67 is of such extent considered in the axial direction of the shaft 47, as to provide a small clearance for the head of screw 66 to permit limited axial pivotal movement of the screw 66 and thereby also permitting limited vertical pivotal movement of the driving key 57 about its end 65. A bowed spring 68 secured at one end to the end 65 of the driving key 57 and bearing along its mid portion against the bottom of the groove 56 in the shaft 47 and at its free end bearing against the under side of the driving key 57 forces the driving key 57 pivotally outward to an extended position wherein its lug 61 is adapted to engage in the grooves 58, 59 or 60 of the gears 51, 52 or 53, respectively, depending on the position to which the clutch sleeve 62 is shifted.

In the position shown in Figure 4, the driving key lug 61 is shown engaged in the groove 59 of intermediate speed gear 52, whereby the latter is arranged to rotate with the shaft 47 to the exclusion of gears 51 and 53. Upon shifting of clutch sleeve 62 to the left, referring to Figure 4, engagement of spacing washer 54 (between gears 52, 53) with the beveled surface 69 of the driving key lug 61 forces lug 61 to a retracted position out of engagement with groove 59 of gear 52 against the force of spring 68 to a neutral position, and upon continued shifting of clutch sleeve 62, the driving key lug 61 is urged outwardly to extended position by spring 68 whereupon it will engage groove 60 of low speed gear 53, rotatably connecting gear 53 with shaft 47. Similarly, by shifting the clutch sleeve 62 to the right as viewed in Figure 4, the driving key lug 61 will engage groove 58 of low speed gear 51 to rotatably connect gear 51 with shaft 47.

The means for shifting the clutch sleeve 62 includes a recurvate shifting lever 70 having a vertical shaft portion 71 extending through and rotatably mounted in vertically spaced horizontal flanges 72 and 73 extending into compartment 29 from the front wall of the housing 23. Outward of the housing 23, the shifting lever 70 includes a shaft portion 74 extending in a downward direction from the upper end of shifting lever shaft portion 71, terminating in a ball handle 75. Secured to the shifting lever shaft portion 71 between the horizontal flanges 72 and 73, by suitable means such as pin 76, is the hub 77 of clutch yoke 78. Upper and lower yoke arms 79 and 80 extend rearward from hub 77, respectively over and beneath the shifting shaft 47 and are provided, respectively, with rollers 81 and 82 at diametrically opposite sides of the shaft 47 engageable between the flanges 83 and 84 of the clutch sleeve 62. Thus by moving the ball handle laterally in one direction or the other, shifting lever shaft portion 71 is rotated, in turn rotating the clutch yoke 78 which by reason of engagement with the flanges 83 and 84 shifts the clutch sleeve along the shifting shaft 47 whereby the driving key 57 may be selectively engaged with any one of the change speed gears 51, 52 or 53.

Gears 51, 52 and 53 are arranged to be in constant mesh with small diameter high speed gear 85, intermediate diameter intermediate speed gear 86 and large diameter low speed gear 87, respectively, which gears 85, 86 and 87 are keyed on driving shaft 39. Rotation at a selected speed is thus imparted to driving shaft 39 from continuously rotating shaft 47 through gears 51, 85; 52, 86; or 53, 87; depending on the position of driving key 57. Of course, when the driving key 57 is moved to retracted position by reason of engagement of its lug 61 with the inner surface of one of the spacer washers 54, no rotational movement is imparted to driving shaft 39.

A bevel pinion 88 is mounted on shaft 39 between a suitable thrust bearing 89 and bearing 41, and is secured thereto for rotation therewith by suitable means, as by the pin 90. Bevel pinion 88 is in driving engagement with a bevel gear 91 which is fastened to the upper end of a vertical shaft 92 by suitable means, as by pin 93. Vertical shaft 92 extends downwardly through an opening 94 in the bottom of the overhanging portion of housing 23, and is journaled in vertically spaced bearings 95 and 96. Bearings 95 and 96 are carried in a vertical sleeve portion 97 of the annular vertical shaft support 98 which is rigidly secured to the bottom of the overhanging portion of housing 23 by screws 99 and forms a closure for the opening 94. An oil seal 100 is provided between the vertical shaft 92 and the inner wall of the vertical sleeve 97.

A planetary head or beater shaft support 101 is carried on the lower extremity of vertical shaft 92, being secured for rotation therewith by suitable means, as by a key 102, and additionally supported by a retaining ring 103. The planetary head 101 is provided near its periphery with vertically spaced bearings 104 and 105 in which is rotatably mounted the vertical beater spindle shaft 106. Beater spindle gear 107 is secured to the upper end of shaft 106 by a pin 108, the hub of the gear 107 resting on the inner race of bearing 104 for supporting the shaft 106. The gear 107 is adapted to engage an internal ring gear 109 which is removable but securely mounted on the peripheral under side of the vertical shaft support 98 by the same screws 99 which as previously explained secure the vertical shaft support 98 to the under side of the overhanging portion of housing 23. Thus, the beater shaft 106 is adapted to rotate about its own axis as it revolves in an orbit about the axis of vertical shaft 92, imparting to the beater shaft a planetary movement.

The lower end of shaft 106 is adapted to support a beater 110 or other attachment that extends downwardly into the bowl 111. Any suitable means may be employed for detachably locking the beater 110 or other attachment to the shaft 106. For purpose of illustration, the lower end of shaft 106 has secured thereto a collar 112 provided with a downwardly projecting lug 113 adapted to be received in a notch 114 in a flange 115 provided at the upper end of the beater 110. Pivoted to the collar 112 is a U-shaped spring clip or bail 116, which is arranged to engage the flange 115 for supporting the beater 110 and which when swung upwardly on its pivot, disengages the flange 115 permitting the beater to be dropped or drawn off the lower end of shaft 106.

Vertically adjustable bowl support means 117 is provided for raising the bowl in position for mixing the contents thereof, and lowering the bowl in position for removal from the mixer. The bowl supporting means 117 is approximately U-shaped in plan and comprise two forwardly and outwardly curved arms 118 and 119, straddling the bowl 111 and a bight portion 120 at the rear of the bowl 111. At one end of the bight portion 120, the bowl supporting means 117 is provided with a sleeve 121 slidable on a vertical guide rod 122 which is suitably secured at its lower end in a sleeve-like boss 123 formed with and extending upwardly from the base 20. Extending laterally outward from the boss 123 is a shaft 124 on which is eccentrically mounted a cam disc 125, the periphery of which is arranged to engage the bottom of the sleeve 121 of the bowl support 117. By raising or lowering a handle 126 projecting from the cam disc 125, the cam disc 125 oscillates to raise or lower the bowl support means 117 together with the bowl 111.

The sleeve 121 of the bowl support means 117 in addition to be slidable on vertical guide rod 122, as above described, is also adapted for turning movement about the axis of guide rod 122, whereby the bowl support means 117 together with the bowl 111 can be swung laterally and outwardly in an arc from a position directly under the beater shaft support 101 to a position under the discharge end of an auxiliary appliance, as for example, a meat grinder, carried by the auxiliary attachment housing 42.

A removable pin 127 extending through a boss 128 on the front side of the column 21 and into the bight portion 120 of the bowl support means 117 properly locates the bowl 111 in mixing position. For properly locating the bowl 111 on the bowl support means 117, removable pins 129 are provided which extend through ears 131 at the sides of the bowl 111, into the forward ends of the arms 118 and 119 of the bowl support means 117.

It will be understood that various changes in construction and arrangement of parts of the device embodying my invention may be made without departing from the spirit of my invention within the scope of the appended claims.

I claim:

1. A mixing machine having a base, a pedestal at one end of said base, a housing mounted on said pedestal and overhanging said base, a motor mounted in the rear portion of said housing over said pedestal and having a horizontal drive shaft extending into the overhanging front portion of said housing, a vertical output shaft rotatably supported in and depending from the overhanging portion of said housing and terminating at its upper end in the lower portion of said overhanging housing portion beneath the free end of said motor shaft, a horizontal main shaft having its axis normal with respect to the axis of said motor shaft, said horizontal main shaft being disposed between the free end of said motor shaft and the upper end of said output shaft and being journaled at its ends in respective side walls of said housing, a horizontal counter shaft in axial parallelism with respect to said main shaft journaled at its ends in respective side walls of said housing, said counter shaft being disposed with its axis offset forwardly of the free end of said motor shaft and the axis of said main shaft and lying in a plane below the level of the axis of said motor shaft and above the level of the axis of said main shaft, a speed reducing drive connection between said motor shaft and said counter shaft including a worm fixed on the free end of said motor shaft, gear means freely supported on said main shaft and engaging said worm, a gear fixed on said counter shaft and engaging said gear means on said main shaft, a plurality of constantly meshed change speed gears on said main and counter shafts, the change speed gears on said main shaft being fixed thereon and the change speed gears on said counter shaft being rotatable thereon, means for engaging a selected change speed gear on said counter shaft in driven relation therewith for imparting rotation at a selected speed from said counter shaft to said main shaft, and means secured to said main shaft for operatively connecting said main shaft with said vertical output shaft for rotating the latter.

2. A mixing machine in accordance with claim 1 including a power take-off coupling means axially alined with and connected to one end of said main shaft for operating at a selected speed an auxiliary appliance disposed at one lateral side of the overhanging portion of said housing.

References Cited in the file of this patent

UNITED STATES PATENTS

| | | |
|---|---|---|
| 1,824,328 | Cammann | Sept. 22, 1931 |
| 2,024,282 | Geiger | Dec. 17, 1935 |
| 2,046,784 | Krause | July 7, 1936 |
| 2,185,155 | Meeker et al. | Dec. 26, 1939 |
| 2,457,612 | Thiel | Dec. 28, 1948 |

FOREIGN PATENTS

| | | |
|---|---|---|
| 927,949 | France | May 19, 1947 |
| 1,044,064 | France | June 17, 1953 |